(12) United States Patent
Bremer et al.

(10) Patent No.: US 9,760,801 B2
(45) Date of Patent: Sep. 12, 2017

(54) IDENTIFICATION OF UNCOMMON OBJECTS IN CONTAINERS

(71) Applicant: Lawrence Livermore National Security, LLC, Livermore, CA (US)

(72) Inventors: Peer-Timo Bremer, Livermore, CA (US); Hyojin Kim, Livermore, CA (US); Jayaraman J. Thiagarajan, Livermore, WA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/709,741

(22) Filed: May 12, 2015

(65) Prior Publication Data
US 2016/0335524 A1 Nov. 17, 2016

(51) Int. Cl.
| | |
|---|---|
| G06K 9/62 | (2006.01) |
| G06T 7/00 | (2017.01) |
| G06T 7/10 | (2017.01) |
| G06T 7/11 | (2017.01) |

(52) U.S. Cl.
CPC ......... *G06K 9/6218* (2013.01); *G06K 9/6215* (2013.01); *G06K 9/6256* (2013.01); *G06T 7/0012* (2013.01); *G06T 7/10* (2017.01); *G06T 7/11* (2017.01); *G06T 2207/30112* (2013.01)

(58) Field of Classification Search
CPC ... G06K 9/6218; G06K 9/6215; G06K 9/6256
USPC .......................................................... 382/225
See application file for complete search history.

(56) References Cited

U.S. PATENT DOCUMENTS

2009/0175411 A1* 7/2009 Gudmundson ........ G01N 23/04
378/57

OTHER PUBLICATIONS

Achanta, R., Shaji, A., Lucchi, A., Fua, P., and Süsstrunk, S., "SLIC Superpixels Compared to State-of-the-Art Superpixel Methods," IEEE Transactions on Pattern Analysis and Machine Intelligence, vol. 34, No. 11, pp. 2274-2282, 2012.
Boykov, Y., and Jolly, P., "Interactive Graph Cuts for Optimal Boundary & Region Segmentation of Objects in N-D Images," Proc. 8th IEEE Int'l. Conf. on Computer Vision, vol. 1, pp. 105-112, 2001.

(Continued)

*Primary Examiner* — Ruiping Li
(74) *Attorney, Agent, or Firm* — Perkins Coie LLP

(57) ABSTRACT

A system for identifying in an image an object that is commonly found in a collection of images and for identifying a portion of an image that represents an object based on a consensus analysis of segmentations of the image. The system collects images of containers that contain objects for generating a collection of common objects within the containers. To process the images, the system generates a segmentation of each image. The image analysis system may also generate multiple segmentations for each image by introducing variations in the selection of voxels to be merged into a segment. The system then generates clusters of the segments based on similarity among the segments. Each cluster represents a common object found in the containers. Once the clustering is complete, the system may be used to identify common objects in images of new containers based on similarity between segments of images and the clusters.

31 Claims, 16 Drawing Sheets

(56) References Cited

OTHER PUBLICATIONS

Chen, H., Chang, H., and Liu, T., "Local Discriminant Embedding and Its Variants," IEEE Conf. on Computer Vision and Pattern Recognition, vol. 2, pp. 846-853, Jun. 20-25, 2005.

Li, Q., Zhang, H., Guo, J., Bhanu, B., and An, L., "Reference-Based Scheme Combined with K-SVD for Scene Image Categorization," IEEE Signal Processing Letters, vol. 20, No. 1, pp. 67-70, Nov. 21, 2012.

* cited by examiner

IDENTIFICATION OF UNCOMMON OBJECTS IN CONTAINERS

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

In many environments, there is a need to identify objects within an image generated from a scan of a container that contains the objects. For example, in an airport security environment, an image generated from a scan of a bag may need to be analyzed to determine whether the bag contains any prohibited objects. As another example, in a medical environment, an image generated from a scan of a patient may need to be analyzed to determine whether the patient has a tumor. The scanning technology may be computed tomography ("CT"), and the images may be three-dimensional ("3D") images.

To analyze an image, traditional image analysis techniques partition the image into multiple segments (groups of pixels or voxels) that each may represent an object within the image. This partitioning is referred to as image segmentation. A goal of image segmentation is to use the low-level information at each voxel to infer high-level semantics such as differentiating between foreground and background or finding an object. However, in many applications the source data is noisy or otherwise corrupted by artifacts, making low-level features such as edges or voxels difficult to detect.

Some image analysis techniques use additional domain knowledge to constrain the segmentation. For example, in a medical environment, a model with parameters describing characteristics of an organ (e.g., shape) may be used to identify a segment that contains that organ. Many environments, however, cannot readily use such models, for example, due to the large variety of objects that may be in a container. In such environments, the additional domain knowledge may be provided as a form of training data with samples of objects of interest. The image analysis techniques use the training data to learn parameters of the segmentation algorithm (e.g., thresholds, smoothness, and energy functionals). The use of training data, however, has some difficulties. One difficulty is that the collecting and labeling of the samples can be very labor-intensive. Another difficulty is that often no set of parameters exists that sufficiently represents the variations in the training data. Another difficulty is that the training data cannot represent unknown objects that have not been seen before (e.g., a new form of a prohibited object).

DETAILED DESCRIPTION

Figure 1:
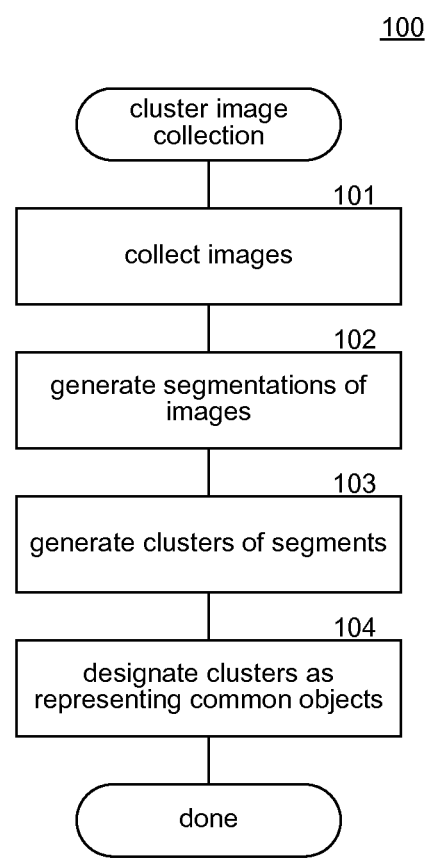
FIG. 1 is a flow diagram that illustrates the generating of clusters of segments of common objects for an image collection in some embodiments.

Method and systems for identifying in an image an object that is commonly found in a collection of images and for identifying a portion of an image that represents an object based on a consensus analysis of segmentations of the image is provided. In some embodiments, an image analysis system collects images of containers that contain objects for generating a collection of common objects. For example, the containers may be bags that are scanned during normal operation of an airport security system. The objects within the containers are considered to be common objects. To process the images, the image analysis system generates a segmentation of each image. Some of the segments of the images will represent common objects, and other segments of the image may represent artifacts within the image or a portion of an object or portions of multiple objects, which may occur for example, due to the image being noisy. For example, if a bag contains two picture frames that overlap at a 45° angle, a single segment may contain both picture frames, or separate segments may contain the overlapping portion and each portion that does not overlap. The image analysis system may also generate multiple segmentations for each image by introducing variations in the selection (e.g., a randomization) of voxels to be merged into a segment.

The image analysis system then generates clusters of the segments based on similarity among the segments. The image analysis system may generate a feature vector for each segment and calculate a similarity based on a distance between the feature vectors. If a cluster satisfies a common object criterion (e.g., contains many segments), then those segments contain images of something (e.g., an object) that was commonly found in images of the containers (e.g., dress shoes in suitcases). If a cluster contains very few segments, then those segments may contain noisy images, images of multiple objects, uncommon objects, and so on. The image analysis system may also generate a representative feature vector for the segments of the cluster.

Once the clustering is complete, the image analysis system may be used to identify common objects in (or, more precisely, common segments derived from) images of new containers. Upon receiving an image of a new container, referred to as a target container, the image analysis system generates a segmentation of the image and generates a feature vector for each segment. The image analysis system compares each of the feature vectors to the representative feature vectors of the clusters to determine which feature vectors correspond to objects represented by a cluster. If a feature vector is similar to that of a representative feature vector of a cluster, then that feature vector represents a segment containing a common object.

The image analysis system may be used, for example, as part of an airport security system to screen checked bags. Initially, the image analysis system can be used to generate a collection of images of bags that were scanned during normal operation of an airport security system. The images may be collected at various airports at various times and may include tens of millions of images. The image analysis system can then be used to generate one or more segmentations of each image, which may identify billions of segments. The image analysis system can then be used to generate clusters of similar segments. Because the images may be noisy, many of the identified segments may represent artifacts of the images. Nevertheless, because the images are of such a large number of bags, it is likely that a large number of segments will correspond to common objects found in checked bags, such as shoes, hair dryers, hangers, and so on. Thus, clusters that contain a large number of segments are likely to correspond to such common objects. Because the clusters with a large number of segments represent common objects, such clusters are very unlikely to represent prohibited objects that would represent a security threat.

After the clusters are generated, the image analysis system can then be used to screen bags during normal operations of an airport security system. As an image of a bag is collected, the image analysis system can be used to generate one or more segmentations of the image. The image analysis system can then filter out those segments that satisfy a non-object criterion such as being too small or too noisy to represent an object. The image analysis system can then compare the clusters of segments to identify which segments correspond to common objects and filter out those segments. If any segments remain, the image analysis system may raise an alert for manual intervention or conduct additional analysis. The image analysis system may conduct the additional analysis by applying a classifier that is adapted to identify prohibited objects. For example, the classifier may be trained using segments that are generated from images of prohibited objects. Because the image analysis system has already filtered out segments that likely do not represent prohibited objects, the classifier can focus on a very small subset of the segments, which is likely to reduce the number of false positive and false negative identifications of segments.

In some embodiments, the images collected by an airport security system can be added to the collection of images on an ongoing basis so that the corpus of common objects can change over time to represent changes in the types of objects that are commonly included in checked bags. Also, clusters of segments generated from images of prohibited objects could be added to the collection and tagged as prohibited. During normal airport security screening, if a segment matches a cluster tagged as prohibited, the image analysis can flag the segment for special manual or automated processing. In addition, airport personnel could be requested to label those segments not identified as containing a common object with an object type. Over time, the image analysis system can use those labeled common objects to identify matching objects that would not otherwise be identified as common objects because of, for example, an insufficient number of segments in a cluster.

In some embodiments, the image analysis system may generate multiple segmentations of each image. For each segmentation of an image, the image analysis system introduces a randomization of the merge order of segments of the image so that each segmentation represents a different segmentation of the image. This randomization helps compensate for noise and artifacts. After generating the segmentations of an image, the image analysis system compares the segments of the image to sample segments that have been labeled with their object type to determine the best matching object type for each segment. The sample segments may be generated, for example, from images of prohibited objects, with each sample segment labeled with the type of the prohibited object. The image analysis system may then label each segment of the image with the best matching object type. Because there are multiple segmentations of an image, there may be multiple segments that, because of the randomization, are somewhat different but correspond to the same object of the image. Such multiple segments are likely to be labeled with the object type of that object. The image analysis system then generates a single consensus segment from the multiple segments that correspond to the same object using a consensus algorithm to select voxels to include in the consensus segment based in part on how many of the multiple segments include the voxels.

The image analysis system may be used to analyze objects in a variety of containers. For example, the containers can be shipping containers such as for cargo ships, trains, trucks, and so on, and the images can be collected by security systems for ships, trains, trucks, and so on. In addition, the image analysis system may be used in conjunction with additional information to assist in the identification of objects. For example, a shipping manifest or bill of lading may identify the type of objects within a container. The image analysis system may maintain a mapping from the types of objects to the clusters of segments generated from containers that contain those types of objects. For example, the image analysis system may map segments or clusters of segments generated from images on containers whose bills of lading specify bananas to the object type of banana. When a target image is associated with a certain type of object, the image analysis system may use the mapping to determine whether the image contains segments similar to those segments that are mapped to that object type. For example, if a bill of lading specifies bananas but the target image does not have any segments that are similar to those previously associated with bananas, then the image analysis system may signal a discrepancy. Also, the image analysis system may use information from the bill of lading to help guide the identification of common objects. For example, the image analysis system may first check for similarity to clusters that are associated with bananas to help determine whether any segments match bananas. The image analysis system may also use information of the type of objects that are likely to be in a container together. For example, a tennis racket and a can of tennis balls are likely to be in the same checked bag. If objects in the shape of a can of tennis balls and a tennis racket are identified in a target image, then the image analysis may assume that the object in the shape of a can of tennis balls does not need any further processing. If, however, the checked bag does not contain an object in the shape of a tennis racket, the image analysis system may flag the checked bag as needing further processing. The image analysis system may also employ other techniques to help identify uncommon or prohibited objects. For example, the image analysis information may use density information derived from a target image to flag an unusual object. For example, if an object appears to be a six-pack of cans of soft drinks, but one of the cans appears to be more dense than the other five cans, the image analysis may flag the checked bag as needing further processing.

In some embodiments, the image analysis system constructs a collection of bottom-up hierarchical segmentations from an initial set of supervoxels. A supervoxel is a group of connected voxels that share similar characteristics. The image analysis system may use a Simple Linear Iterative Clustering ("SLIC") algorithm to identify the supervoxels, although various other algorithms may be used such as graph-based algorithms, gradient-ascent-based algorithms, and so on. (See Achanta, R., Shaji, A., Lucchi, A., Fua, P., and Süsstrunk, S., "SLIC Superpixels Compared to State-of-the-Art Superpixel Methods," IEEE Transactions on Pattern Analysis and Machine Intelligence, Vol. 34, No. 11, pp. 2274-2282, 2012, which is hereby incorporated by reference.) Each supervoxel may include 10-15 voxels. The image analysis system may use the same set of supervoxels for each segmentation. For each segmentation, the image analysis system incrementally merges segments from the previous (e.g., lower) level of the hierarchy into segments at the current level. The image analysis system merges connected segments based on a similarity measure referred to as edge affinity. The edge affinity, $w_{i,j}^l$, between two segments $r_i^l$ and $r_j^l$ in level l is measured as the similarity between their intensity histograms as specified in the following equation:

$$w_{i,j}^l = \exp(-\sigma_1 \chi^2(H(r_i^l), H(r_j^l))) \quad (1)$$

where $H(r_i^l)$ is the intensity histogram of segment $r_i^l$, $\chi^2$ is the chi-square distance between two histograms, and $\sigma_1$ is a parameter for this Gaussian radial basis function.

The image analysis system generates multiple independent segmentations from the same set of supervoxels by randomizing the merging order of candidate edges. At level l, the image analysis system may sort the edges in descending order based on their edge weights. The image analysis system then extracts a candidate edge set, $E_C^l = \{e_{i,j}^l | w_{i,j}^l \geq \delta\}$, where $\delta$ is a threshold. From the set of candidates, the image analysis system randomly selects edges sequentially and merges the segments connected by that edge if either of the segments have not been merged previously. The image analysis system may use other more sophisticated techniques such as a technique that biases the probability of choosing an edge according to its weight. However, more sophisticated techniques may not lead to any substantial change in the overall results. Also, a wide range of thresholds $\delta$ may be used without any substantial change in the overall results.

After generating the segmentations of an image, the image analysis system identifies segments that are similar to sample segments in a sample collection of segments of sample objects, also referred to as ground truth or model objects, that are labeled with their object type, also referred to as class. The image analysis system may represent each segment by a feature vector that includes (1) intensity statistics (e.g., mean, standard deviation, and percentiles), (2) shape features (e.g., histogram of number of voxels in each radii bin from the center of mass), (3) area, and (4) ratio of the volume to surface area. The image analysis system may use the ground truth objects to generate a mapping function that maps such a high-dimension feature vector into a low-dimension feature vector that can accurately represent the ground truth object. During the segmentation process, the image analysis system may use the high-dimension feature vectors or may use the low-dimension feature vectors generated by the mapping function to speed up the processing. The feature vectors may also be referred to as semantic descriptors. The image analysis may use local discriminant embedding to generate the semantic descriptors. (See Chen, H., Chang, H., and Liu, T., "Local Discriminant Embedding and Its Variants," IEEE Conf. on Computer Vision and Pattern Recognition, vol. 2, pp. 846-853, Jun. 20-25, 2005, which is hereby incorporated by reference.)

To generate the mapping, the feature vectors for the ground truth objects T may be represented by a matrix $X = [\chi_i]_{i=1}^T$ and their class labels may be denoted as $\{\gamma_i | \gamma_i \in \{1, 2, \ldots, N_c\}\}_{i=1}^T$, where $N_c$ indicates the total number of classes. The image analysis system uses both label information and the local structure in data to create a subspace representation that can discriminate between different classes of objects. The image analysis system constructs the undirected, intra-class and inter-class graphs G and G', respectively, and codes the edges between the sample objects in affinity matrices W and W'. The affinities are represented by the following equations:

$$w_{i,j} = \begin{cases} 1 & \text{if } y_i = y_j \text{ AND } [i \in N_k(j) \text{ OR } j \in N_k(i)] \\ 0 & \text{otherwise} \end{cases} \quad (2)$$

$$w_{i,j}' = \begin{cases} 1 & \text{if } y_i \neq y_j \text{ AND } [i \in N_k'(j) \text{ OR } j \in N_k'(i)] \\ 0 & \text{otherwise} \end{cases} \quad (3)$$

Here $N_k(i)$ and $N_k'(i)$ denote an intra-class and inter-class neighborhood for the sample object $\chi_i$. The image analysis system builds the intra-class graph Laplacian as $L = D - W$, where D is a degree matrix with each diagonal element containing the sum of the corresponding row or column of L. The image analysis system then constructs the inter-class graph Laplacian L'. The image analysis system computes the d projection directions for the local discriminant, embedding V by optimizing the following equation:

$$\max_V \frac{Tr[V^T X^T L' X V]}{Tr[V^T X^T L X V]} \quad (4)$$

Instead of finding the global solution to the trace-ratio maximization problem of Equation 4, the image analysis system may find a greedy solution by converting the problem into the equivalent ratio-trace maximization of max, $Tr[(V^T X^T L X V)^{-1} V^T X^T L' X V]$. The image analysis system employs a generalized eigenvalue decomposition and uses the d top eigenvectors as the projection directions V. The image analysis then uses V to map high-dimension feature vectors into low-dimension feature vectors.

Given the semantic descriptor for a segment, the image analysis system estimates the likelihood of that segment containing each of the sample objects. Though any non-parametric modeling technique can be used to obtain the likelihood estimates, the image analysis may use a simple reference-based scheme. (See Li, Q., Zhang, H., Guo, J., Bhanu, B., and An, L., "Reference-Based Scheme Combined with K-SVD for Scene Image Categorization," IEEE Signal Processing Letters, vol. 20, no. 1, pp. 67-70, Nov. 21, 2012, which is hereby incorporated by reference.) By computing the average similarity of the semantic descriptor for a segment to each class of sample objects, the image analysis system measures the relevance of each class. The image analysis system employs a similarity metric as represented by the following equation:

$$S(r, g_i^k) = 1 - \frac{\gamma\left(\frac{k}{2}, \frac{d(r, g_i^k)}{2}\right)}{\Gamma\left(\frac{t}{2}\right)} \quad (5)$$

where $d(r, g_i^k)$ denotes the $\chi^2$ distance between the semantic descriptor of a segment r and that of the $i^{th}$ sample object in class k, $\gamma(.)$ is the lower incomplete gamma function, $\Gamma$ denotes the gamma function, and t is a positive integer that specifies the number of degrees of freedom. The second term in the expression is the cumulative distribution for chi-squared distribution. For a sample class k, the image analysis system may use the average similarity of the segment with respect to all sample objects in that class to define the likelihood as represented by the following equation:

$$L_k(r) = \frac{1}{n_k}\sum_{i=1}^{n_k} S(r, g_i^k) \quad (6)$$

After computing the average similarity measure for all classes, the image analysis system may normalize L(r) to sum to 1.

For each segmentation, the image analysis system calculates the likelihood L for all segments whose volume is higher than a domain-specific threshold and assigns the segment to one of the $N_c$ classes if the corresponding likelihood (referred to as a confidence measure) is greater than a confidence threshold. The image analysis system processes all levels in the hierarchy of the segmentation and retains only the most likely segments as candidate segments. The image analysis system creates the set of candidate segments C by merging the individual sets from all hierarchies.

After identifying the candidate segments C, the image analysis system may sort them in the decreasing order of their confidence measures. The image analysis system then selects a set of candidate segments $C_H$ by selecting the candidate segment with the highest confidence $c_0 \in C$ and then selecting the candidate segments that are assigned to the same class and that have a high volume overlap ratio with $c_0$. The image analysis system performs a consensus graph cut segmentation on the union of candidate segments of $C_H$. The image analysis system identifies the set of supervoxels $V_0$ in the union of the candidate segments of $C_H$ and identifies the corresponding set of edges $E_0$. The image analysis system uses a segmentation indicator set $A = \{\alpha_i\}$ with a binary label $\alpha_i$ (e.g., foreground/background or object/non-object) for each supervoxel in $V_0$. The image analysis system then identifies the labeling of the supervoxels in $V_0$ that optimize an objective function, which is a Markov random field formulation for graph cuts as represented by the following equation:

$$F(A) = \sum_{r_i^0 \in V_0} F_d(\alpha_i) + \lambda \sum_{e_{i,j}^0 \in E_0} F_s(\alpha_i, \alpha_j) \quad (7)$$

where $F_d$ represents a data penalty function based on similarity of intensities and $F_s$ represents a consensus function. (See Boykov, Y., and Jolly, P., "Interactive Graph Cuts for Optimal Boundary & Region Segmentation of Objects in N-D Images," Proc. 8th IEEE Int'l Conf. on Computer Vision, vol. 1, pp. 105-112, 2001.) To define the data penalty function $F_d$, the image analysis system builds a 256-bin intensity histogram for each supervoxel and clusters the supervoxels into K=2 groups using K-means clustering. Given the two cluster centroids $H_0$ and $H_1$, the image analysis system represents the data cost $F_d(\alpha_i)$ for supervoxel $r_i^0$ as $\exp(-\gamma\chi^2(H(r_i^0), H_0))$ and $\exp(-\gamma\chi^2(H(r_i^0), H_1))$ for the foreground and background labels, respectively. To define $F_s$, the image analysis performs a consensus inference on the supervoxel composition from all candidate segments of $C_H$. The image analysis system generates a consensus matrix S by, for each pair of supervoxels of $V_0$, counting the number of candidate segments where the two supervoxels are not merged ($\eta(i,j)$) and setting $s_{ij}=1-(\eta(i,j)/N_H)$, where $N_H$ is the total number of candidate segments of $C_H$. The value for $F_s(\alpha_i,\alpha_j)$ is $s_{ij}$. The image analysis system then finds a labeling of the supervoxels of $V_0$ that optimizes the objective function. The supervoxels that are labeled as foreground or object represent a segment of the image. The image analysis system then removes the candidate segments $C_H$ used in the current iteration from the set of candidate segments C and repeats this procedure until the set of candidate segments C is empty.

FIG. 1 is a flow diagram that illustrates the generating of clusters of segments of common objects for an image collection in some embodiments. A cluster image collection component 100 collects images and generates clusters of segments that represent common objects. In block 101, the component collects images from containers that contain objects. For example, the images may be collected via an airport security system during normal screening of bags. In block 102, the component generates a segmentation of each image in the collection of images. In some embodiments, the component may generate multiple segmentations for each image. In block 103, the component generates clusters of the segments of the images based on similarity among the segments. For example, if water bottles are commonly packed in checked bags, then the component may generate a cluster of segments for each type of water bottle that is commonly packed in a checked bag. In block 104, the component designates each cluster that satisfies a common object criterion as representing a common object of the containers. The common object criterion may be that the segment includes some minimum number of segments. The component may also pass the segments of the clusters through a classifier for prohibited objects to ensure that none of the common objects would also be considered prohibited objects. The component then completes.

Figure 2:
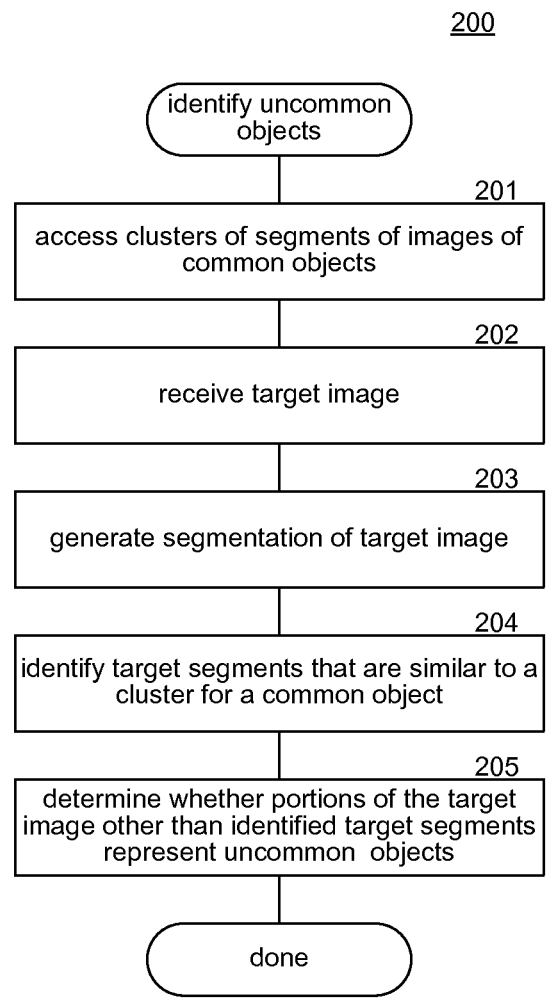
FIG. 2 is a flow diagram that illustrates the identifying of uncommon objects in some embodiments.

FIG. 2 is a flow diagram that illustrates the identifying of uncommon objects in some embodiments. An identify uncommon objects component 200 determines whether a target image includes an uncommon object by filtering out common objects from the target image. In block 201, the component accesses clusters of segments of common objects, for example, those that have been generated from images collected via an airport security system during normal screening of bags. In block 202, the component receives a target image. In block 203, the component generates one or more segmentations of the target image. In block 204, the component identifies and filters out target segments that are similar to clusters of segments that represent common objects. In block 205, the component determines whether portions of the target image that have not been identified as being part of a common object correspond to an uncommon object. The component then completes.

Figure 3:
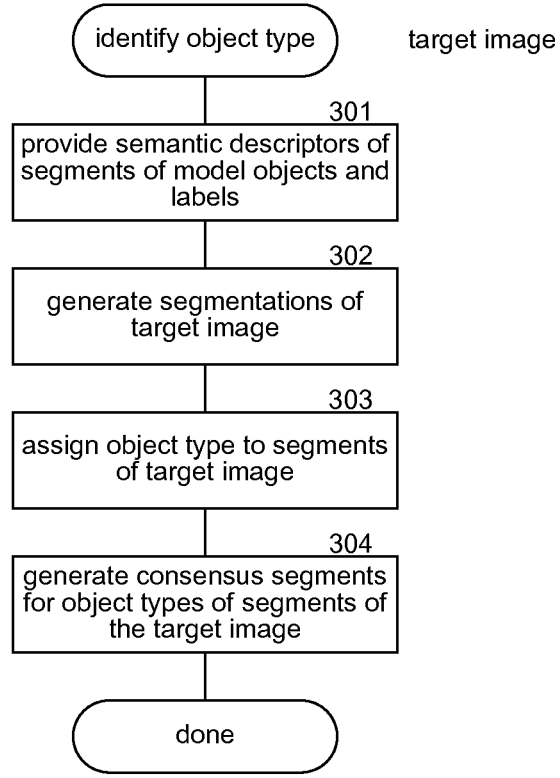
FIG. 3 is a flow diagram that illustrates the identifying of the object type of an object in some embodiments.

FIG. 3 is a flow diagram that illustrates the identifying of the object type of an object in some embodiments. An identify object type component 300 is provided a target image and generates segmentations of the image and combines the segments to generate consensus segments. In block 301, the component accesses a collection of semantic descriptors of segments of model objects that have been labeled with their object type. In block 302, the component generates multiple segmentations of the target image. In block 303, the component assigns an object type to segments of the target image based on similarity among the segments of the target image and segments of the model objects. In block 304, the component generates a consensus segmentation for each assigned object type from the segments of the target image and then completes.

Figure 4:
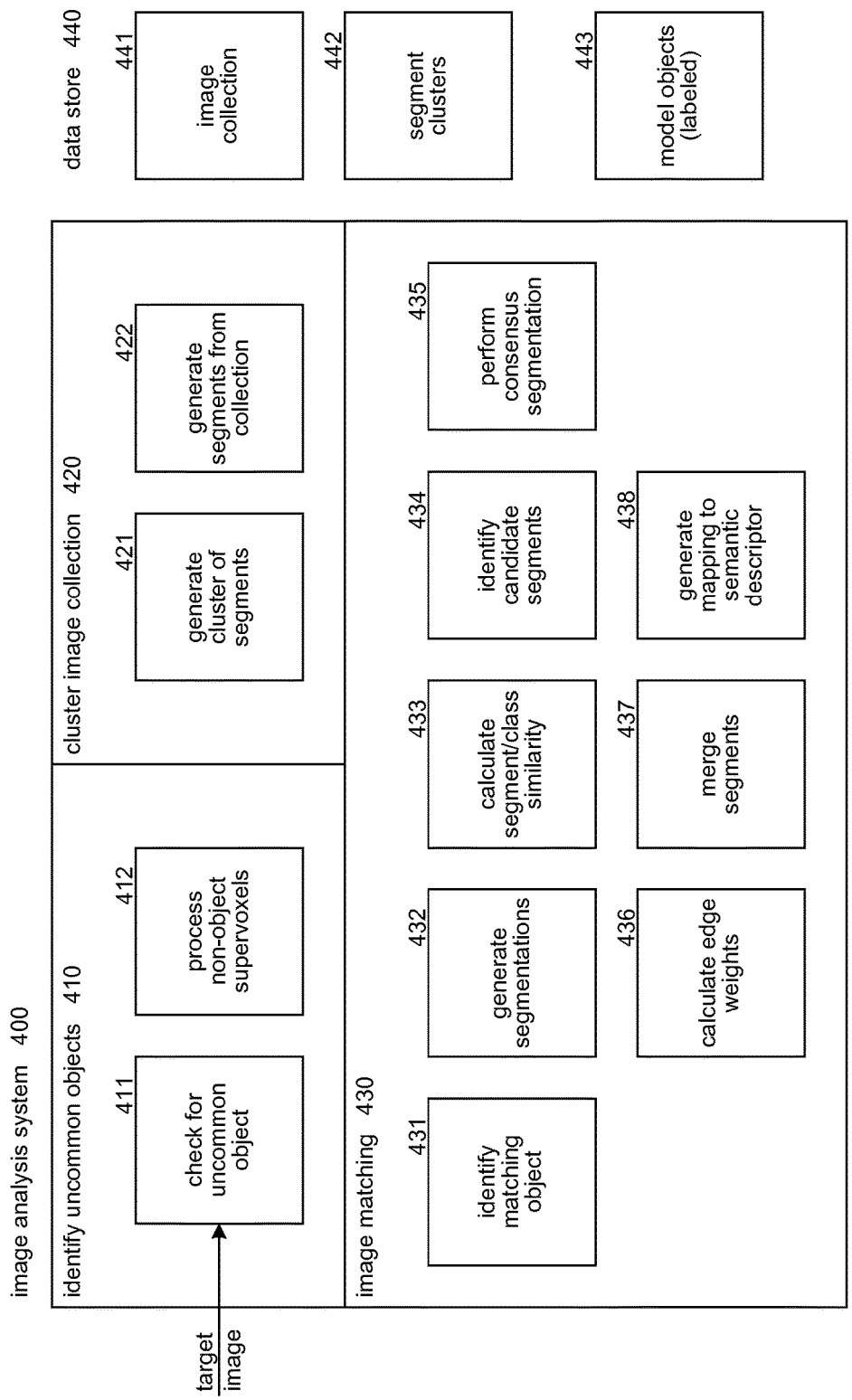
FIG. 4 is a block diagram that illustrates components of an image analysis system in some embodiments.

FIG. 4 is a block diagram that illustrates components of an image analysis system in some embodiments. An image analysis system 400 includes an identify uncommon objects component 410, a cluster image collection component 420, an image matching component 430, and a data store 440. The data store 440 includes an image collection store 441, a segment clusters store 442, and a model objects store 443. The image collection store contains images of containers of objects. The segment clusters store contains cluster segments of images of common objects found in the image collection store. The model objects store contains segment descriptors of model objects along with a labeling of their object types. The cluster image collection component includes a generate clusters of segments component 421 and a generate segments from collection component 422. The generate clusters of segments component invokes the generate segments from collection component to generate segmentations of images of the image collection and generates clusters of the segments of the segmentations, which are stored in the segment clusters store. The identify uncommon objects component includes a check for uncommon objects component 441 and a process non-object supervoxels component 412. The check for uncommon objects component generates a segmentation of the target image, identifies which segments correspond to common objects identified in the segment clusters store, and invokes the process non-object supervoxels component to identify any uncommon objects. The image matching component 430 includes an identify matching object component 431, a generate segmentations component 432, a calculate segment/class similarity 433, an identify candidate segments component 434, a perform consensus segmentation component 435, a calculate edge weights component 436, a merge segments component 437, and a generate mapping to semantic descriptor component 438. The identify matching object component invokes the other components of the image matching component to identify objects within a target image that correspond to a model object of the model objects store. As described below, the identify uncommon objects component and the cluster image collection component may invoke components of the image matching component.

The computing devices and systems on which the image analysis system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the image analysis system. The data transmission media is used for transmitting data via transitory, propagating signals or carrier waves (e.g., electromagnetism) via a wired or wireless connection.

The image analysis system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the system may be implemented in hardware using, for example, an application-specific integrated circuit ("ASIC").

Figure 5:
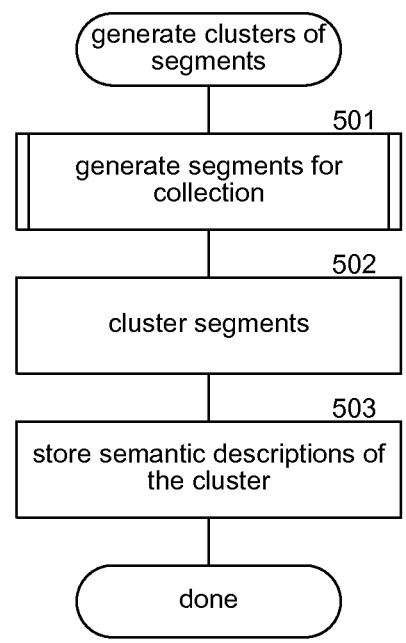
FIG. 5 is a flow diagram that illustrates the processing of a generate clusters of segments component in some embodiments.

FIG. 5 is a flow diagram that illustrates the processing of a generate clusters of segments component in some embodiments. The generate clusters of segments component 500 is invoked to generate clusters of segments that correspond to common objects. In block 501, the component invokes a generate segments for collection component to generate segmentations of images in the collection, each segmentation of an image identifies segments of the image. In block 502, the component clusters the segments based on similarity of the segments. In block 503, the component stores in the segment clusters store along with an indication of the semantic descriptors that are representative of each cluster. The component may also store an indication of the number of segments in each cluster and an indication of whether each cluster satisfies a common object criterion. The component then completes.

Figure 6:
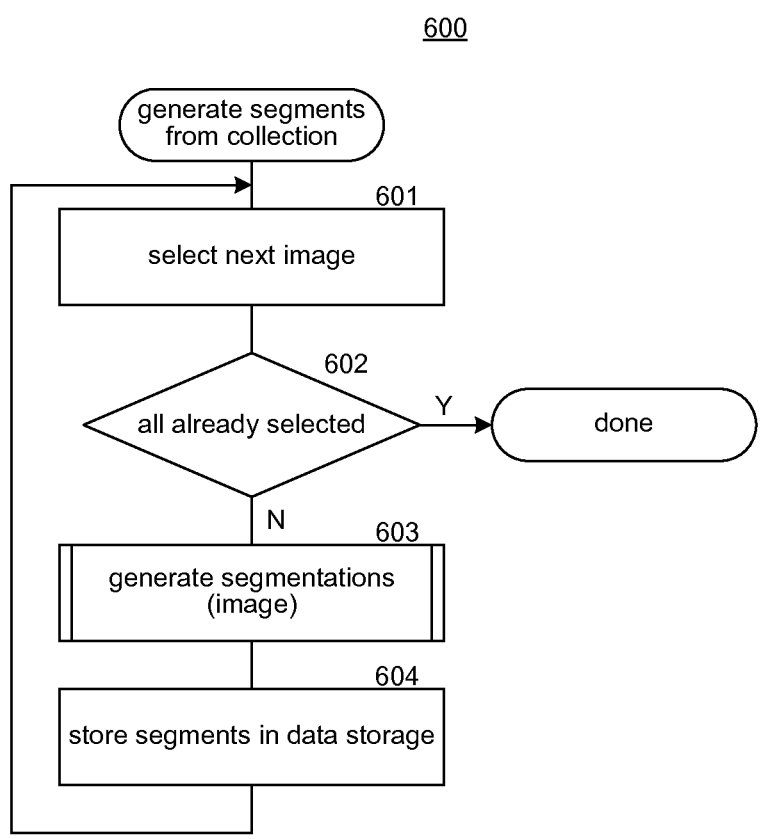
FIG. 6 is a flow diagram that illustrates the processing of a generate segments from collection component in some embodiments.

FIG. 6 is a flow diagram that illustrates the processing of a generate segments for collection component in some embodiments. The generate segments from image collection component 600 is invoked to generate segments of images in the image collection store. In block 601, the component selects the next image of the image collection store. In decision block 602, if all the images have already been selected, then the component completes, else the component continues at block 603. In block 603, the component invokes a generate segmentations component to generate segmentations of the selected image. In block 604, the component stores an indication of the segments and then loops to block 601 to select the next image.

Figure 7:
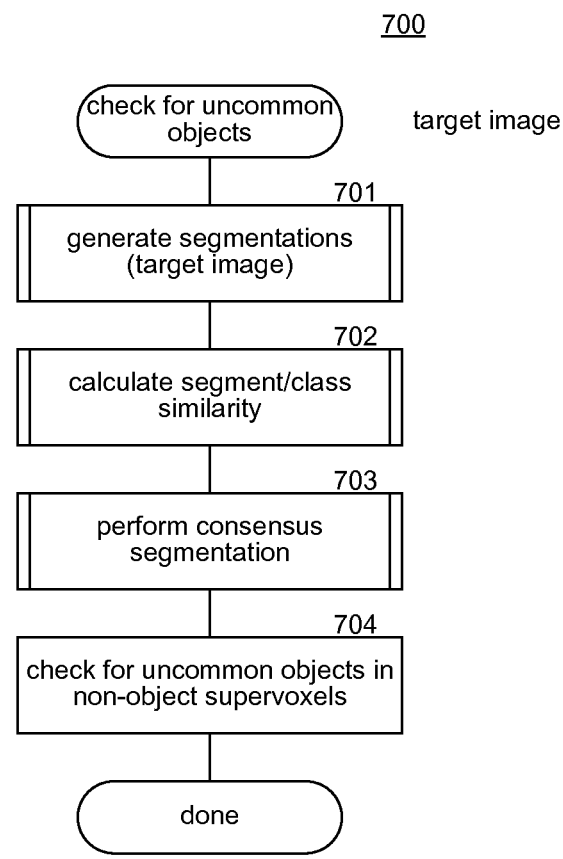
FIG. 7 is a flow diagram that illustrates the processing of a check for uncommon objects component in some embodiments.

FIG. 7 is a flow diagram that illustrates the processing of a check for uncommon objects component in some embodiments. The check for uncommon objects component 700 is invoked to determine whether a target image contains an uncommon object. In block 701, the component invokes a generate segmentations component to generate segmentations of the target image. In block 702, the component invokes a calculate segment/class similarity component to determine the object type or class of each segment. In block 703, the component invokes a perform consensus segmentation component to generate consensus segments for the target image. In block 704, the component checks for uncommon objects in non-object supervoxels and then completes.

Figure 8:
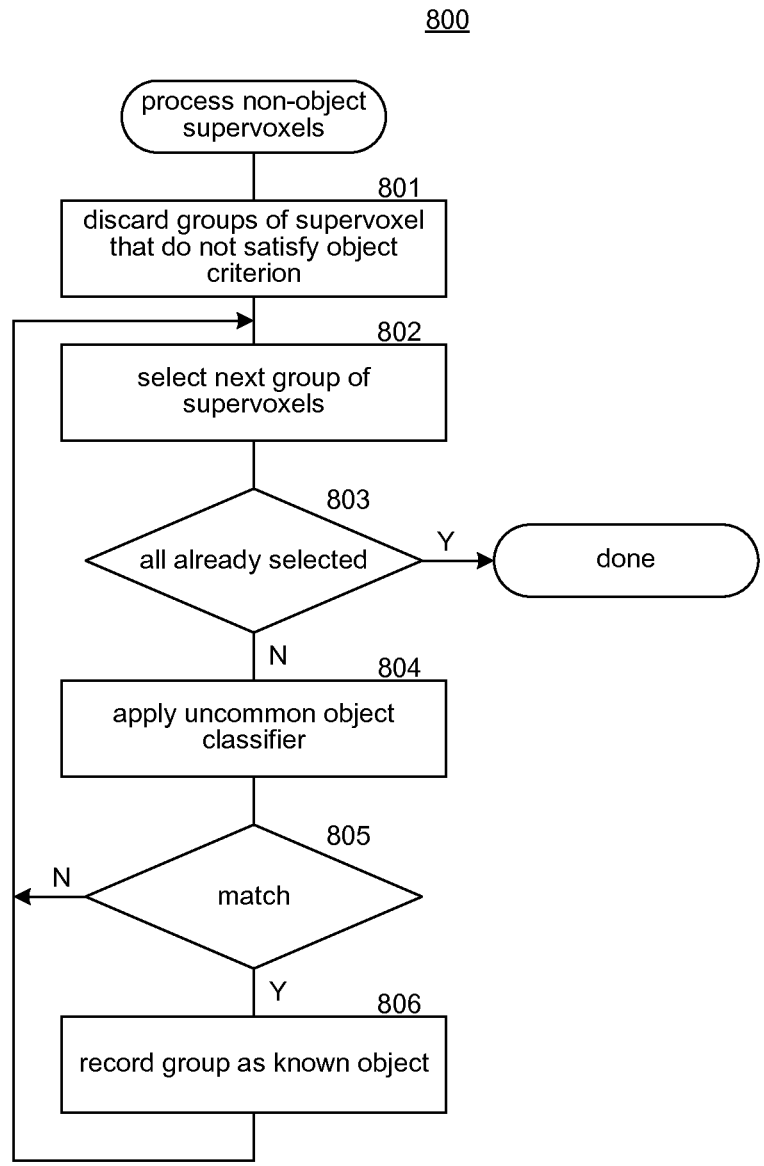
FIG. 8 is a flow diagram that illustrates the processing of a process non-objects supervoxels component in some embodiments.

FIG. 8 is a flow diagram that illustrates the processing of a process non-objects supervoxels component in some embodiments. The process non-objects supervoxels component 800 is invoked to determine whether the supervoxels represent an uncommon object. In block 801, the component may discard groups of supervoxels that did not satisfy an object criterion such as not having sufficient volume. In block 802, the component selects the next group of supervoxels. In decision block 803, if all the groups of supervoxels have already been selected, then the component completes, else the component continues at block 804. In block 805, the component applies an uncommon object classifier to determine whether the selected group of supervoxels represents a known uncommon object. In decision block 804, if a known uncommon object was found, the component continues at block 806, else the component loops to block 802 to select the next group of supervoxels. In block 806, the component records the group as a known uncommon object and then loops to block 802 to select the next group of supervoxels.

Figure 9:
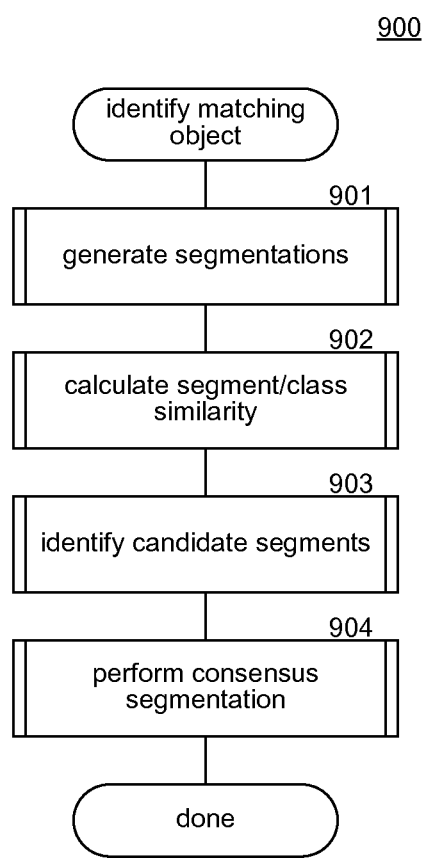
FIG. 9 is a flow diagram that illustrates the processing of an identify matching object component in some embodiments.

FIG. 9 is a flow diagram that illustrates the processing of an identify matching object component in some embodiments. The identify matching object component 900 is invoked to determine whether a target image includes an object that matches a model object. In block 901, the component invokes a generate segmentations component to generate segmentations of the target image. In block 902, the component invokes a calculate segment/class similarity component to determine the object type of each segment. In block 903, the component invokes an identify candidate segments component to identify candidate segments before consensus segmentation. In block 904, the component invokes a perform consensus segmentation component to generate consensus segments for the target image and then completes.

Figure 10:
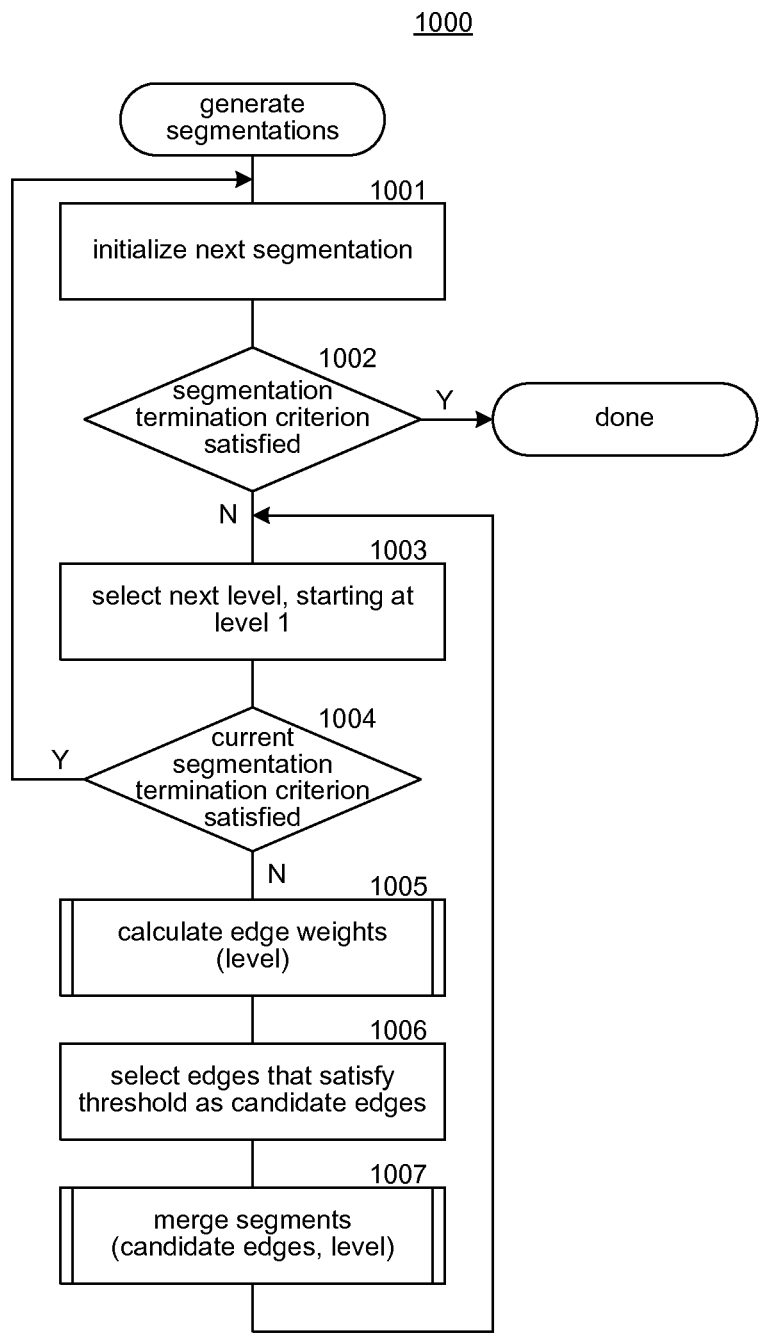
FIG. 10 is a flow diagram that illustrates the processing of a generate segmentations component in some embodiments.

FIG. 10 is a flow diagram that illustrates the processing of a generate segmentations component in some embodiments. The generate segmentations component 1000 is invoked to generate segmentations of a target image. The component may initially identify supervoxels within the target image. In block 1001, the component initializes the next segmentation of the image, for example, by specifying that each supervoxel corresponds to a lowest level segment. In decision block 1002, if a segmentation termination criterion has been satisfied, then the component completes, else the component continues at block 1003. A segmentation termination criterion may specify a certain number of segmentations that are to be generated for each target image. In block 1003, the component selects the next level in a hierarchy of segments for the target image starting with the first level. In decision block 1004, if a current segmentation termination criterion has been satisfied for the selected level, then the component loops to block 1001 to initialize the next segmentation of the target image, else the component continues at block 1005. In block 1005, the component invokes a calculate edge weights component to calculate edge weights between segments for merging at the selected level. In block 1006, the component selects as merge candidate edges those edges that satisfy a threshold for merging. In decision block 1007, the component invokes a merge segments component to merge the candidate segments for the selected level. The component then loops to block 1003 to select the next level.

Figure 11:
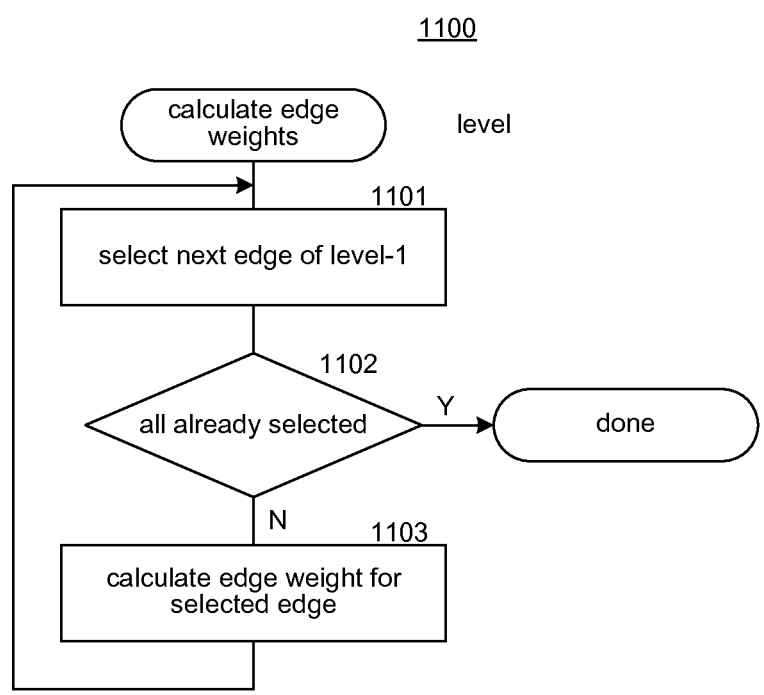
FIG. 11 is a flow diagram that illustrates the processing of the calculate edge weights component in some embodiments.

FIG. 11 is a flow diagram that illustrates the processing of the calculate edge weights component in some embodiments. The calculate edge weights component 1100 is invoked to calculate edge weights between segments of the next lower level. In block 1101, the component selects the next edge of the next lower level. In decision block 1102, if all the edges have already been selected, then the component completes, else the component continues at block 1103. In block 1103, the component calculates the edge weight for the selected edge and then loops to block 1101 to select the next edge.

Figure 12:
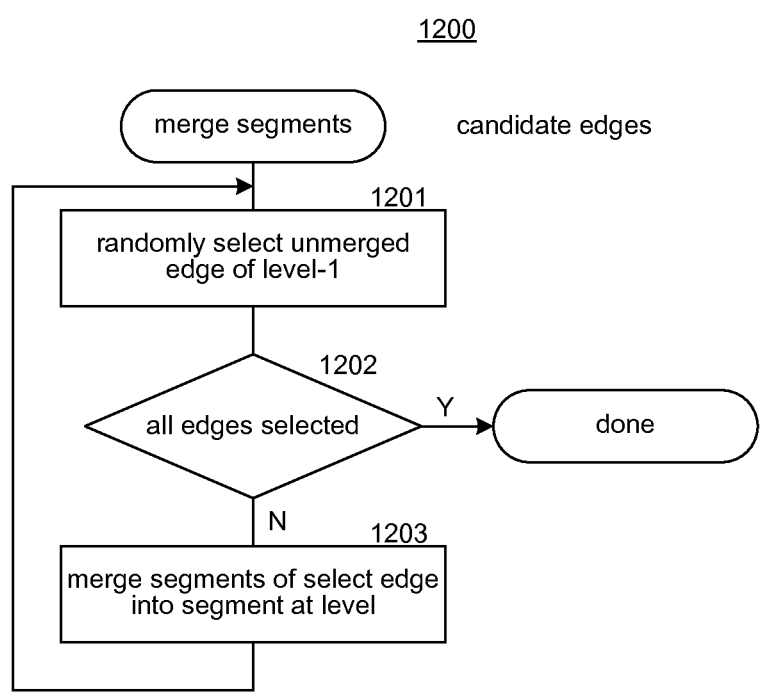
FIG. 12 is a flow diagram that illustrates the processing of a merge segments component in some embodiments.

FIG. 12 is a flow diagram that illustrates the processing of a merge segments component in some embodiments. The merge segments component 1200 is provided candidate edges at the next lower level and merges the segments using a randomization into segments at the current level. In block 1201, the component randomly selects a candidate edge at the next lower level. In decision block 1202, if all the candidate edges have already been selected, then the component completes, else the component continues at block 1203. In block 1203, the component merges the segments connected by the selected candidate edge into a segment at the current level and then loops to block 1201 to select the next candidate edge.

Figure 13:
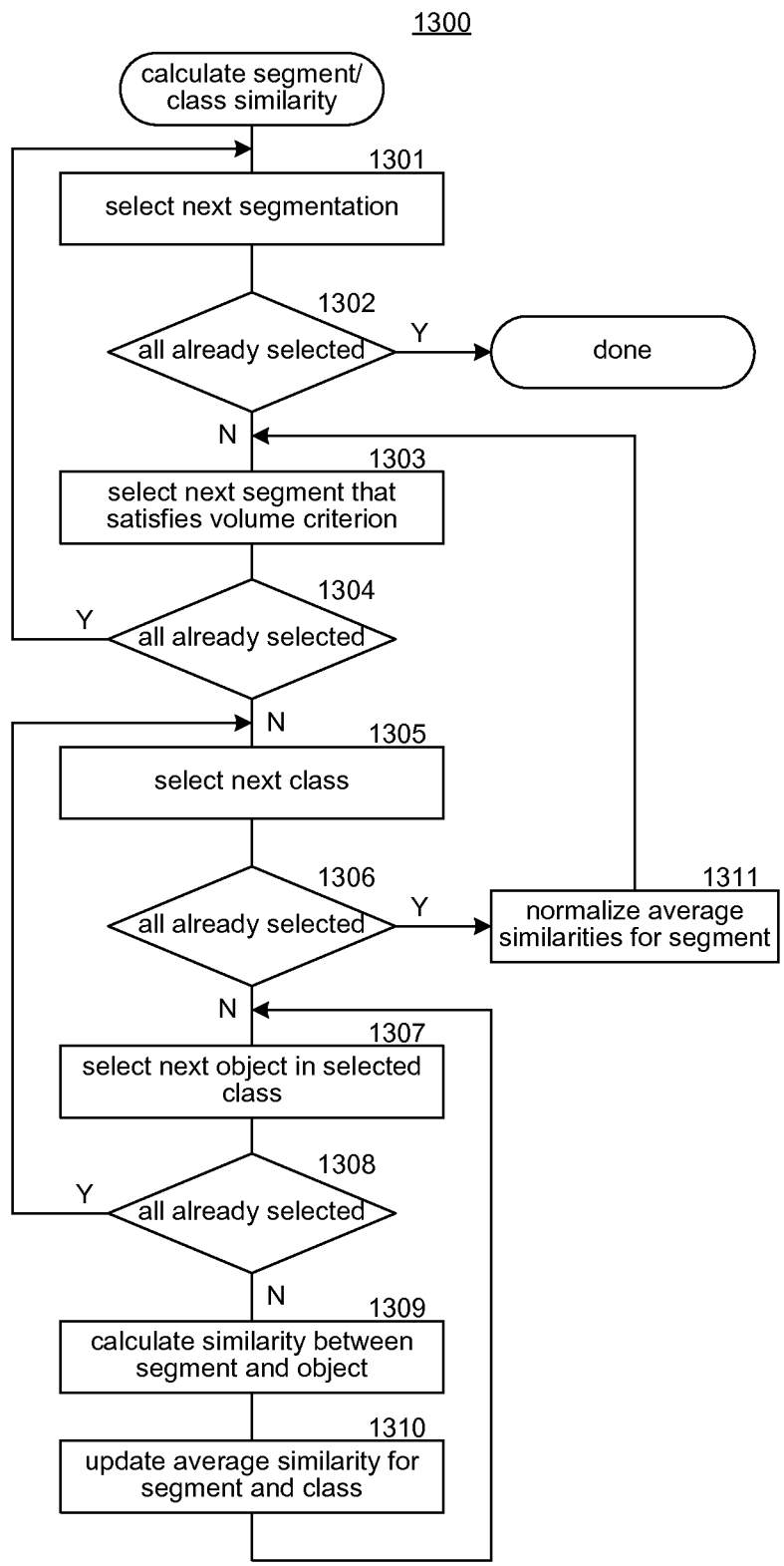
FIG. 13 is a flow diagram that illustrates the processing of a calculate segment/class similarity component in some embodiments.

FIG. 13 is a flow diagram that illustrates the processing of a calculate segment/class similarity component in some embodiments. The calculate segment/class similarity component 1300 is invoked to calculate the similarity of each segment to a model object. In block 1301, the component selects the next segmentation of the target object. In decision block 1302, if all the segmentations have already been selected, then the component completes, else the component continues at block 1303. In block 1303, the component selects the next segment of the selected segmentation that satisfies a minimum volume criterion. In decision block 1304, if all such segments have already been selected, then the component loops to block 1301 to select the next segmentation, else the component continues at block 1305. In component 1305, the component selects the next class of model objects. In decision block 1306, if the classes have already been selected, then the component continues at block 1311, else the component continues at block 1307. In block 1307, the component selects the next object in the selected class. In decision block 1308, if all such objects have already been selected, then the component loops to block 1305 to select the next class, else the component continues at block 1309. In block 1309, the component calculates the similarity between the selected segment and the selected model object. In block 1310, the component updates an average similarity for the selected segment and the selected class and then loops to block 1307 to select the next model object. In block 1311, the component normalizes the average similarities for the selected segment and then loops to block 1303 to select the next segment.

Figure 14:
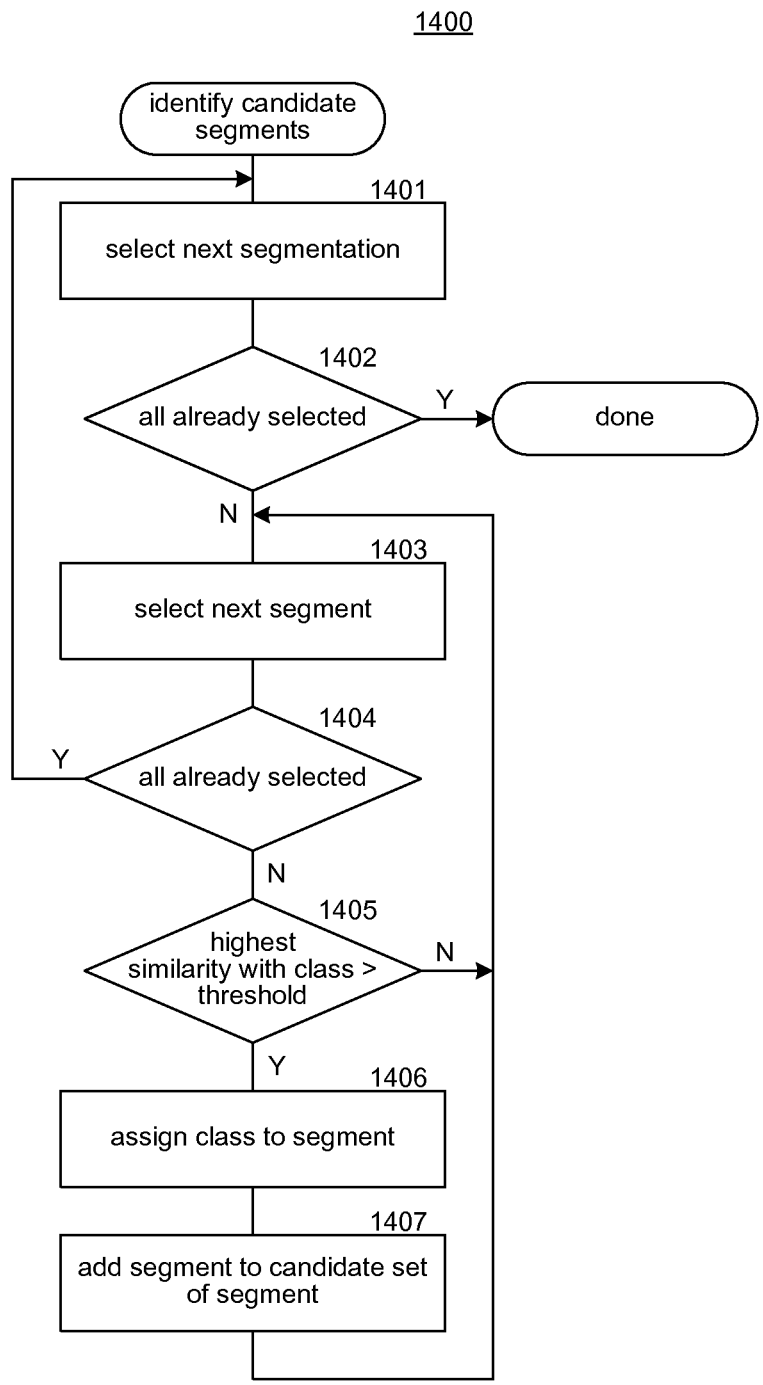
FIG. 14 is a flow diagram that illustrates the processing of an identify candidate segments component in some embodiments.

FIG. 14 is a flow diagram that illustrates the processing of an identify candidate segments component in some embodiments. The identify candidate segments component 1400 assigns a class to segments that satisfy a similarity threshold with that class and adds the segments to a set of candidate segments for generating a consensus segment. In block 1401, the component selects the next segmentation. In decision block 1402, if all the segmentations have already been selected, then the component completes, else the component continues at block 1403. In block 1403, the component selects the next segment of the selected segmentation. In decision block 1404, if all such segments have already been selected, then the component loops to block 1401 to select the next segmentation, else the component continues at block 1405. In decision block 1405, if the highest similarity to a class for that segment is greater than a similarity threshold, then the component continues at block 1406, else the component loops to block 1403 to select the next segment. In block 1406, the component assigns that class to the selected segment. In block 1407, the component adds the segment to a set of candidate segments and then loops to block 1403 to select the next segment.

Figure 15:
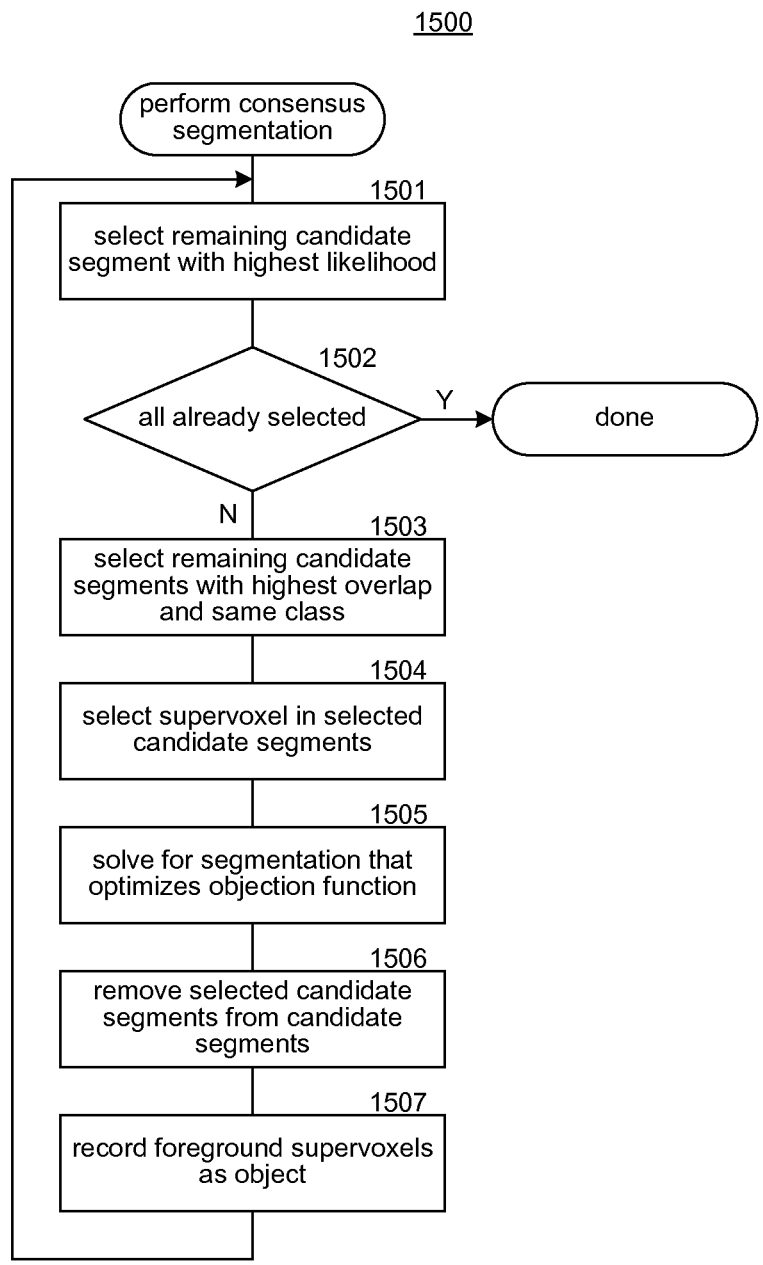
FIG. 15 is a flow diagram that illustrates the processing of a perform consensus segmentation component in some embodiments.

FIG. 15 is a flow diagram that illustrates the processing of a perform consensus segmentation component in some embodiments. The perform consensus segmentation component 1500 generates consensus segments from the set of candidate segments. In block 1501, the component selects the next remaining candidate segment with the highest likelihood of its class assignment. In decision block 1502, if all such candidate segments have already been selected, then the component completes, else the component continues at block 1503. In block 1503, the component selects the remaining candidate segments that have a high overlap with the selected candidate segment and that have been assigned to the same class. In block 1504, the component selects the supervoxels in the selected candidate segments. In block 1505, the component solves for a consensus segmentation that satisfies the objective function of Equation 7. In block 1506, the component removes the selected candidate segments from the list of candidate segments that remain. In block 1507, the component records the object supervoxels as representing an object of the class and then loops to block 1501 to select another candidate segment.

Figure 16:
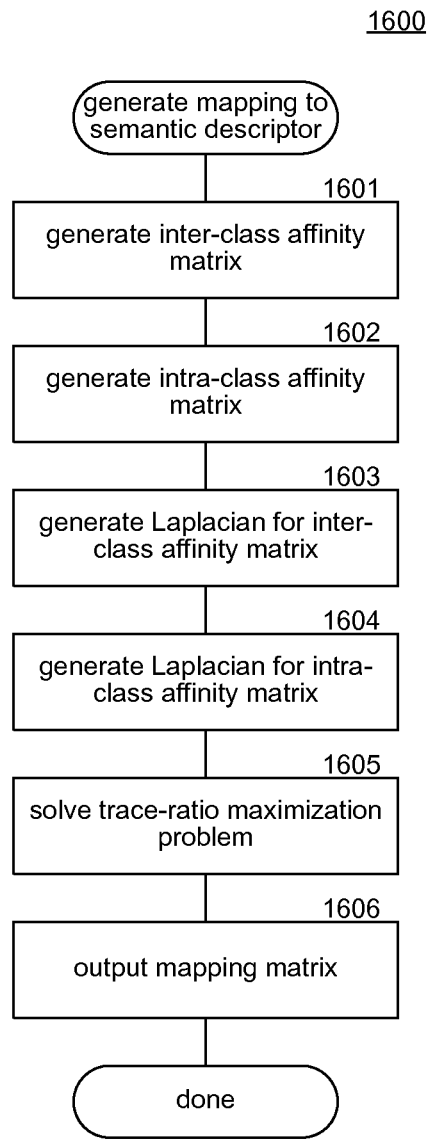
FIG. 16 is a flow diagram that illustrates the processing of a generate mapping to semantic descriptor component in some embodiments.

FIG. 16 is a flow diagram that illustrates the processing of a generate mapping to semantic descriptor component in some embodiments. The generate mapping to semantic descriptor component 1600 is invoked to generate a mapping from a high-dimension feature vector to a low-dimension feature vector based on model objects. In block 1601, the component generates an inter-class affinity matrix for the model objects. In block 1602, the component generates an intra-class affinity matrix for the model objects. In block 1603, the component generates a Laplacian for the inter-class affinity matrix. In block 1604, the component generates a Laplacian for the intra-class affinity matrix. In block 1605, the component solves the trace-ratio maximization problem of Equation 4. In block 1606, the component outputs a mapping matrix for mapping the high-dimension feature vectors to low-dimension feature vectors and then completes.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method performed by a computing device for generating clusters of segments of common objects, the method comprising:
   accessing by the computing device images collected from containers containing objects;
   for each image, generating by the computing device a segmentation of the image, each segmentation having segments;
   generating by the computing device clusters of the segments of the images based on similarity among the segments, wherein each cluster contains segments of images collected from multiple containers; and
   designating by the computing device each cluster that satisfies a common object criterion as representing a common object of the containers.

2. A computing system for identifying an uncommon object, the computing system comprising:
   a computer-readable storage medium storing computer-executable instructions for controlling the computing system to:
      access clusters of segments of images, each cluster representing segments of a common object appearing in images collected from containers of common objects;
      receive a target image of a target container;
      generate a segmentation of the target image;
      identify segments of the target image that satisfy a common object similarity threshold with a cluster of segments of a common object; and
      determine whether portions of the target image that are not identified as being a common object correspond to an uncommon object; and
   a processor for executing the computer-executable instructions of the computer-readable storage medium.

3. A computer-readable storage medium storing computer-executable instructions for controlling a computing system to identify an object type of an object within a target image, the computer-executable instructions comprising instructions to:
   for each of a plurality of object types of model objects, provide one or more semantic descriptors of model objects of that object type;
   generate a plurality of segmentations of the target image, each segmentation having segments with semantic descriptors;
   for each of a plurality of segments, assign an object type to the segment based on a similarity derived from the semantic descriptor of the segment and semantic descriptors of the model objects; and
   for segments of the target image assigned the same object type and near a common location within the target image, generate a consensus segment representing an object of the object type near the common location based on a combination of whether a portion of the segments represents an object portion or a non-object portion of the segments and the number of segments including that portion.

4. The method of claim 1 wherein the containers are bags and the images are collected at an airport.

5. The method of claim 1 wherein the containers are shipping containers.

6. The method of claim 1 wherein the generating of a segmentation of the image further comprises generating multiple segmentations of each image.

7. The method of claim 1 further comprising:
receiving a target image of a target container;
generating a segmentation of the target image; and
determining whether segments of the target image satisfy a common object similarity threshold to be considered a common object.

8. The method of claim 1 further comprising adding to the generated clusters one or more clusters of segments of images of uncommon objects.

9. The computing system of claim 2 wherein the computer-executable instructions to generate a segmentation of the target image further comprise computer-executable instructions to generate multiple segmentations and wherein the computer-executable instructions to identify segments of the target image that satisfy a common object similarity threshold further comprise computer-executable instructions to perform a consensus segmentation from segments of the target image.

10. The computing system of claim 2 wherein the computer-executable instructions to determine whether portions correspond to an uncommon object further comprise computer-executable instructions to apply a classifier to determine whether a portion corresponds to an uncommon object.

11. The computing system of claim 2 wherein the computer-executable instructions further comprise instructions to access information identifying a target type of an object in the target container and information identifying types of objects in containers of common objects and to determine whether the target container has an object that is similar to a common object in a container containing an object of the target type.

12. The computing system of claim 11 wherein the information identifying a target type is derived from a bill of lading for the target container.

13. The computing system of claim 2 wherein the containers are bags scanned by a security system and the images are generated from the scans of the bags.

14. The computing system of claim 13 wherein the computer-executable instructions further comprise instructions to alert security personnel upon determining that a portion corresponds to an uncommon object.

15. The computing system of claim 13 wherein the security system is selected from the group consisting of an airport security system, a cargo ship security system, a truck security system, and a railroad security system.

16. The computing system of claim 2 wherein the images are 3D images.

17. The computer-readable storage medium of claim 3 wherein the computer-executable instructions further comprise instructions to generate a mapping of feature vectors derived from the model objects to semantic descriptors of the model objects and to use the mapping to map a feature vector of a segment of the target image to a semantic descriptor for the segment.

18. The computer-readable storage medium of claim 3 wherein the instructions to generate a plurality of segmentations of the target image further comprise instructions to identify supervoxels of the target image and, for each segmentation of the target image, to merge supervoxels into segments based in part on a random selection of possible supervoxels to merge so that each segmentation of the target image has different segments.

19. The computer-readable storage medium of claim 3 wherein the portions are supervoxels and the instructions to generate a consensus segment comprise instructions to generate two clusters of supervoxels of the segments based on intensities of the supervoxels such that one cluster represents object supervoxels and the other cluster represents non-object supervoxels.

20. The computer-readable storage medium of claim 19 wherein the instructions to generate a consensus segment comprise instructions to identify an assignment of supervoxels as object supervoxels and non-object supervoxels that tends to optimize an objective function that combines a function indicating whether a supervoxel should be an object supervoxel based on intensities and a function derived from the number of segments that include each supervoxel.

21. The computer-readable storage medium of claim 3 wherein the instructions to generate a consensus segment further comprise instructions to:
designate segments, whose likelihood of being of the assigned object type is greater than a threshold likelihood, as candidate segments; and
repeat the following until there are no remaining candidate segments:
select a candidate segment with a highest likelihood of being of the assigned object type;
select other candidate segments whose assigned object type is the same as the assigned object type of the selected candidate segment and that are near a common location;
select supervoxels of selected candidate segment and the selected other candidate segments;
label each supervoxel as background or foreground wherein the supervoxels that are labeled as foreground form a consensus segment; and
designate the selected candidate segment and the selected other candidate segments as being no longer candidate segments.

22. The computer-readable storage medium of claim 21 wherein the instructions to label the supervoxels further comprises instructions to identify a labeling of the supervoxels that optimizes an objective function.

23. The computer-readable storage medium of claim 22 wherein the objective function is a Markov random field formulation for cut graphs.

24. A method performed by a computing system for identifying an object type of an object within a target image, the method comprising:
for each of a plurality of object types of model objects, providing one or more semantic descriptors of model objects of that object type;
generating a plurality of segmentations of the target image, each segmentation having segments with segment descriptors;
for each of a plurality of segments, assigning an object type to the segment based on a similarity derived from the semantic descriptor of the segment and semantic descriptors of the model objects; and
for segments of the target image assigned the same object type and near a common location within the target image, generating a consensus segment representing an object of the object type near the common location based on a combination of whether a portion of the segments represents an object portion or a non-object portion of the segments and the number of segments including that portion.

25. The method claim 24 further comprising generating a mapping of feature vectors derived from the model objects to semantic descriptors of the model objects and using the mapping to map a feature vector of a segment of the target image to a semantic descriptor for the segment.

26. The method of claim 24 wherein the generating of a plurality of segmentations of the target image further comprises identifying supervoxels of the target image and, for each segmentation of the target image, merging supervoxels into segments based in part on a random selection of possible supervoxels to merge so that each segmentation of the target image has different segments.

27. The method of claim 24 wherein the portions are supervoxels and wherein the generating of the consensus segment includes generating two clusters of supervoxels of the segments based on intensities of the supervoxels such that one cluster represents object supervoxels and the other cluster represents non-object supervoxels.

28. The method of claim 27 wherein the generating of a consensus segment includes identifying an assignment of supervoxels as object supervoxels and non-object supervoxels that tends to optimize an objective function that combines a function indicating whether a supervoxel should be an object supervoxel based on intensities and a function derived from the number of segments that include each supervoxel.

29. The method of claim 24 wherein the generating of a consensus segment comprises:

designating segments, whose likelihood of being of the assigned object type is greater than a threshold likelihood, as candidate segments; and repeating the following until there are no remaining candidate segments:
  selecting a candidate segment with a highest likelihood of being of the assigned object type;
  selecting other candidate segments whose assigned object type is the same as the assigned object type of the selected candidate segment and that are near a common location;
  selecting supervoxels of selected candidate segment and the selected other candidate segments;
  labeling each supervoxel as background or foreground wherein the supervoxels that are labeled as foreground form a consensus segment; and
  designating the selected candidate segment and the selected other candidate segments as being no longer candidate segments.

30. The method of claim 24 wherein the labeling of the supervoxels further comprises identifying a labeling of the supervoxels that optimizes an objective function.

31. The method of claim 30 wherein the objective function is a Markov random field formulation for cut graphs.

* * * * *